United States Patent [19]

Tanner

[11] Patent Number: 4,518,102
[45] Date of Patent: May 21, 1985

[54] METERING DEVICE FOR FLUIDS

[76] Inventor: Dale Tanner, P.O. Box 54, Rte. 47, Hurffville, Sewell, N.J. 08080

[21] Appl. No.: 467,203

[22] Filed: Feb. 17, 1983

[51] Int. Cl.³ ............................................. G01F 11/44
[52] U.S. Cl. ..................... 222/61; 222/250; 222/504; 222/542; 222/556; 251/317
[58] Field of Search ............ 222/41, 43, 46, 61, 222/542, 249–250, 504, 556–557, 309; 251/317, 63

[56] References Cited

U.S. PATENT DOCUMENTS

| 2,491,826 | 12/1949 | Meters et al. | 222/250 X |
| 3,292,824 | 12/1966 | Arp et al. | 222/250 |
| 3,653,545 | 4/1972 | Tanner | 222/250 X |
| 4,162,750 | 7/1979 | Demars et al. | 222/250 |

FOREIGN PATENT DOCUMENTS

| 117797 | 12/1926 | Switzerland | 222/249 |
| 879570 | 10/1961 | United Kingdom | 251/317 |

Primary Examiner—Charles A. Marmor
Attorney, Agent, or Firm—Robert K. Youtie

[57] ABSTRACT

A metering device wherein a cylinder is provided with opposite end closures, a piston is shiftable in the cylinder between the end closures, a conduit extends centrally within the cylinder into a valve plug angularly shiftable within the cylinder and located adjacent to one end closure, the valve plug having angularly spaced passageways communicating respectively with opposite sides of the piston upon angular valve shifting, and a gasket extending in sealing relation about the plug and on opposite sides of the passageways to seal the latter from each other.

8 Claims, 7 Drawing Figures

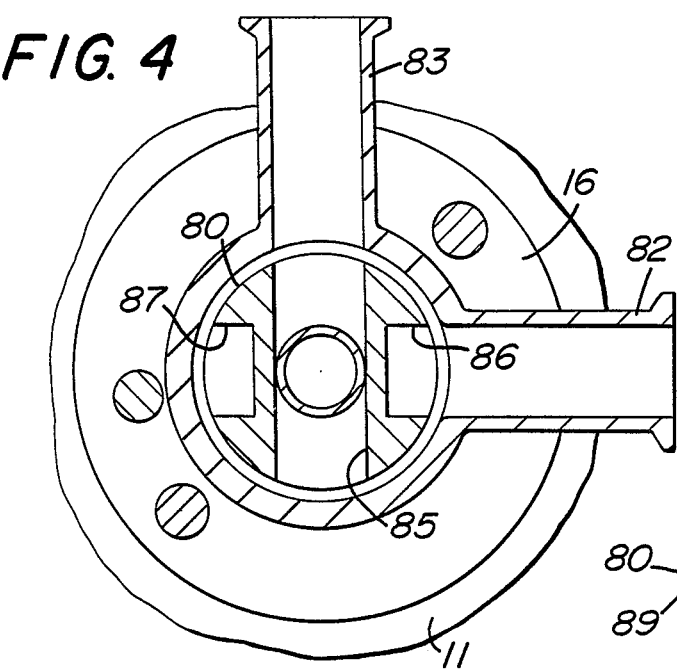
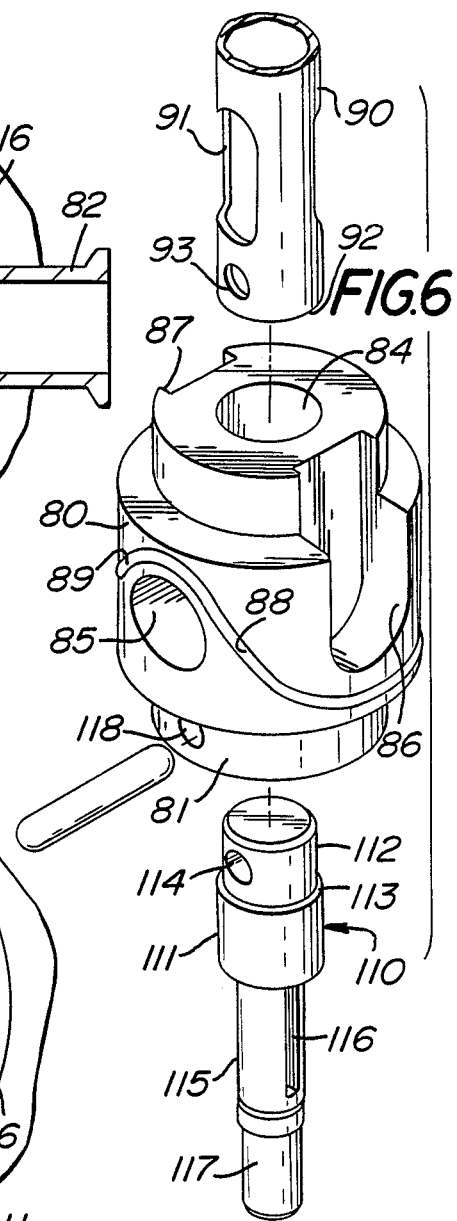
FIG. 4
FIG. 6
FIG. 5

4,518,102

METERING DEVICE FOR FLUIDS

BACKGROUND OF THE INVENTION

This invention is concerned with fluid metering devices of the general type disclosed in my prior U.S. Pat. No. 3,653,545, and is especially concerned with improvements in the metering devices which cooperate to define a proportioning system of the general type disclosed in said patent.

While the metering devices of said prior patent have been eminently satisfactory, certain precision fits and parts designs have contributed to high manufacturing costs and limited the potential market for such devices.

SUMMARY OF THE INVENTION

Accordingly, it is an important object of the present invention to provide a metering device of the type described wherein certain precision of parts manufacture may be omitted to effect substantial savings in costs, without adversely affecting operation or sanitation, as may be required in food processing.

It is another object of the present invention to provide improvements in metering devices of the type described wherein disassembly for cleaning may be accomplished with extreme speed and great ease; and wherein correct reassembly is substantially foolproof; all while providing relatively large orifices for easy flow of viscous or chunky products, as well as various slurries, and wherein there are no screw threads within the product zone, to meet sanitary standards.

It is a further object of the present invention to provide a metering device having the advantageous characteristics mentioned in the preceding paragraphs, wherein rate of flow adjustment is extremely simple and accurate, and may be automatically and remotely controlled, if desired; and further wherein the constancy or accuracy of operation is held within extremely low limits, while repeatability of settings is precise and easily obtained.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWINGS

FIG. 4 is a transverse sectional view taken generally along the line 4—4 of FIG. 1.

FIG. 5 is a transverse sectional view taken generally along the line 5—5 of FIG. 1.

FIG. 6 is an exploded perspective view showing certain components of FIGS. 4 and 5.

DESCRIPTION OF THE PREFERRED EMBODIMENT

Figure 1:
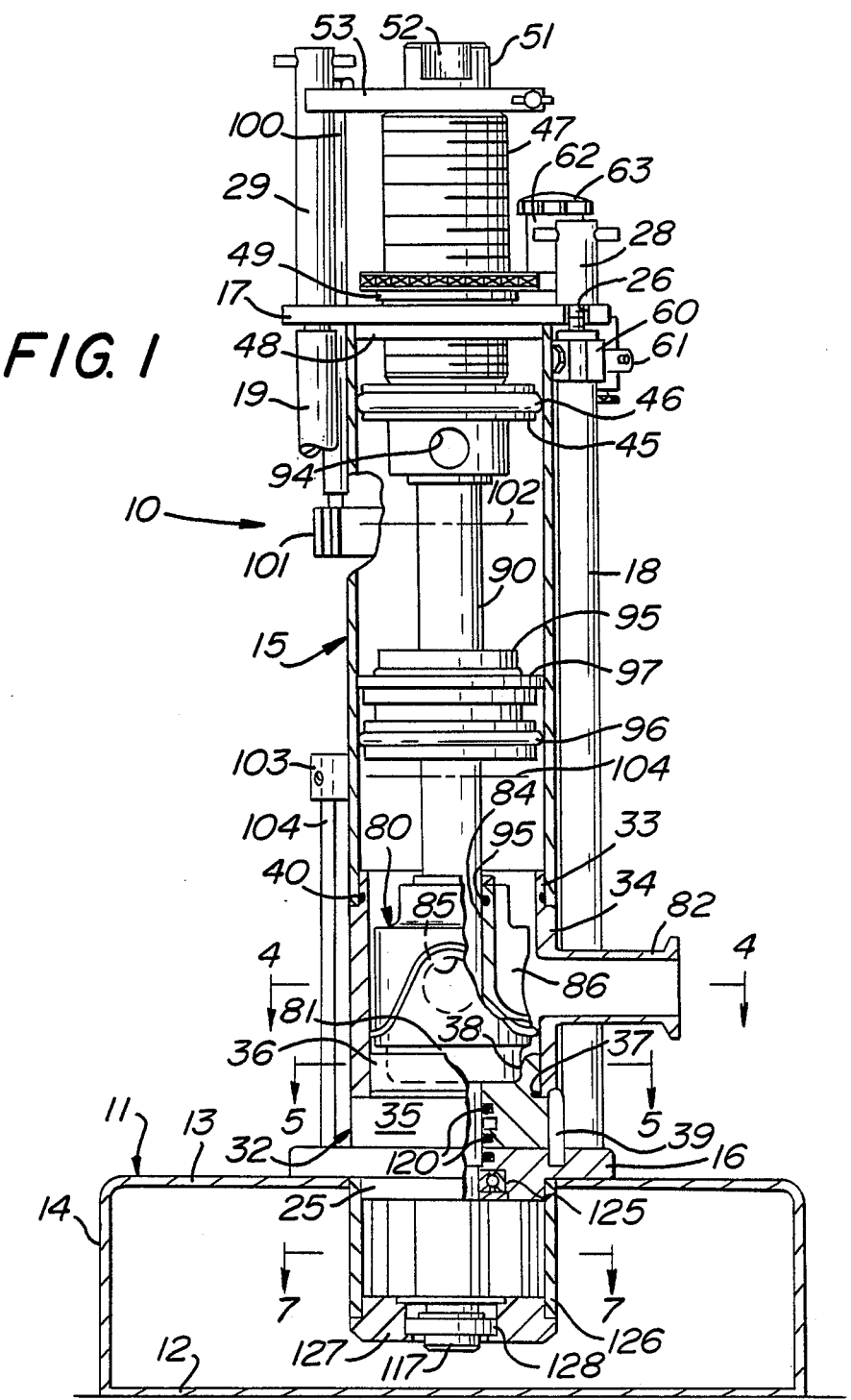
FIG. 1 is an elevational view, partly broken away, showing a metering device of the present invention and illustrating interior detail.

Referring now more particularly to the drawings, and specifically to FIG. 1 thereof, a fluid meter is there generally designated 10, and may be one of several such metering devices in a fluid proportioning system such as that of U.S. Pat. No. 3,653,545. The metering device 10 may include a mounting structure, support or base 11, which may be hollow, including a generally horizontal lower wall 12, upper wall 13 spaced over the lower wall, and a circumferential upstanding side wall 14 extending between the lower and upper walls 12 and 13.

Upstanding from the mount 11 is a generally vertically disposed cylinder 15. More specifically, a lower end member, cap or plate 16 is seated on the upper surface of upper base wall 13; and, the cylinder 15 has its lower end closed by a lower end closure 32 resting on the lower end member 16. An upper end member, plate or cap 17 seats on the upper end of the cylinder 15; and, a plurality of elongate threaded members or tie bolts 18 and 19, say two in number, extend in tension between the lower and upper end members 16 and 17.

More specifically, the lower end member 16 may be secured by any suitable means, such as threaded fasteners, to the base top wall 13 and may be provided on its under side with a generally circular boss 25 depending through the base top wall 13. The upper end member or clamp 17 may be provided with a plurality of notches or slots, such as notches 26 and 27, respectively receiving tie members 18 and 19, the upper ends of which are provided with abutment members or nuts 28 and 29 releasably threaded downwardly into bearing engagement with the upper side of upper cylinder end member 17. Thus, the cylinder 15 is securely mounted upright in position on the base 11, and may be quickly released therefrom by loosening of the tie member nuts 28 and 29, and angularly shifting the upper cylinder end member 17 from the receiving relation of the notches 26 and 27 with the tie members 18 and 19 to release the end member and cylinder.

The lower cylinder end closure 32 includes a plug 35 seated on the end member 16 and reduced extension 36; and, further includes on the upper end of the plug a cylindrical fitting or valve body 34, which extends by a reduced upper end portion 33 into the lower end of cylinder 15. The plug 35 of end closure 32 is in fluid sealed relation with the valve body 34, as by a sealing member or gasket 37; and similarly the upper end of the valve body is in fluid sealed relation with the cylinder 15 by a gasket or sealing member 40.

The reduced extension 36 of closure plug 35 has its upper or inner end recessed, as at 38. The end member 16, plug 35 and valve body or housing 34 may be suitably held against relative rotation, as by a key 39.

Interiorally of the cylinder 15, adjacent to the upper end member 17 is an upper end closure 45, which may include a sealing member or O-ring 46 effecting fluid sealing between the upper end member 45 and the cylinder 15. The upper end closure 45 thus extends across and in closing relation with the upper end of the cylinder 15; and, a threaded adjustment member 47 extends coaxially of the cylinder 15 from the upper or outer side of the upper end closure member 45 through and beyond the upper end member or clamp 17. The threaded member is designated 47. The upper end member 17 includes on its under side a boss 48 depending conformably into the upper end of cylinder 15, to properly locate the cylinder with respect to the end member. An internally threaded annulus or nut 49 is circumposed in threaded engagement about the threaded member 47, and rotatably mounted in the end member 17. Thus, upon rotation of the nut 49, and restraining the threaded member 47 against rotation, the threaded member is adjusted vertically relative to the end member 17 to locate the cylinder end closure 45 at a selected elevation. The nut 49 is provided with a circumferential array of teeth defining a sprocket wheel 50. The upper end of the threaded member 47 may be reduced, as at 51 and provided with flats 52, as for a wrench. A split plate or clamp 53 includes arms 54 engaged about the reduced portion 51 of threaded member 47 and releasably clamped thereto by a suitable means, such as threaded member 55. The clamping member or plate 53 is formed with a notch, cut-out or opening 56 conformably receiving the vertically elongate nut 29 of tie rod 19, to constrain the threaded member 47 to vertical up and down movement, while preventing rotation of the threaded member.

An additional clamping member or mounting plate 60 is clamped, as by a threaded member 61, to the tie rod 18 and extends laterally outwardly therefrom. At its outer end the mounting member 60 is provided with an upstanding rotary member 62 having a manually actuable element or knob 63. A sprocket wheel 64 is carried by the rotary member 62 and a sprocket chain 65 is trained about the sprocket wheels 50 and 64, best seen in FIG. 2. Thus, upon manual rotation of knob 63, the sprocket wheel 64, through the chain 65, drives the sprocket wheel 50 to effect vertical adjustment of the threaded member 47 and its unitary upper cylinder end closure 45.

Figures 2, 3:
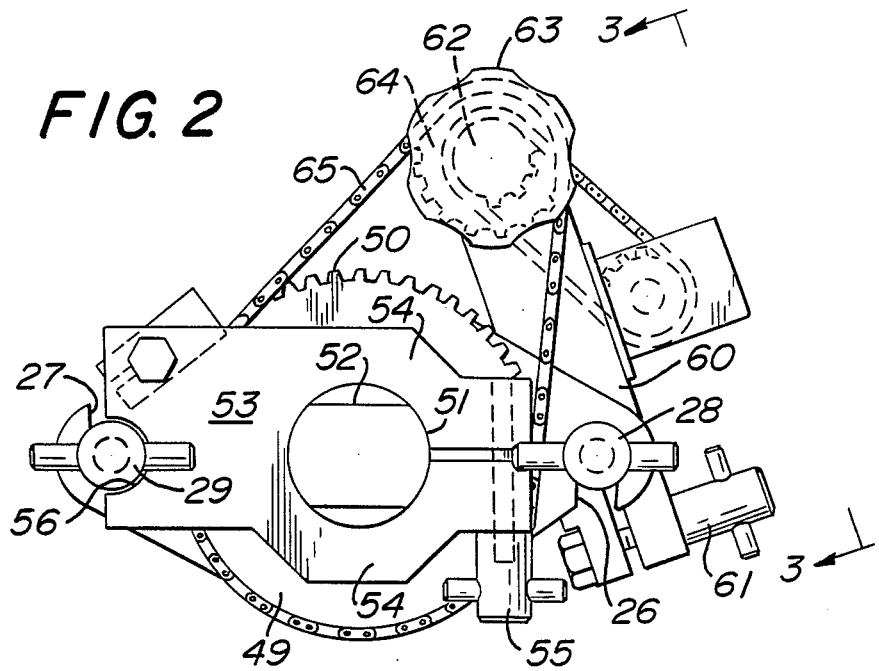
FIG. 2 is a top plan view of the metering device of FIG. 1.
FIG. 3 is a partial elevational view of the metering device of the instant invention taken generally along the line 3—3 of FIG. 2.

Extending coaxially from the lower end of rotary member 62, see FIG. 3, is a shaft 66 carrying a sprocket wheel 67. A counter 68 may be suitably fixed to the mounting member 60, with an operating shaft 69 extending generally parallel to the shaft 66 and carrying a sprocket wheel 70. A sprocket chain 75 may be trained about the sprocket wheels 67 and 70 to operate the counter 68 upon rotation of the knob 63. Thus, very accurate positioning and repositioning of the upper cylinder end closure 45 may be achieved by observation of the counter 68.

Received in the lower end closure 32 of the cylinder 15 is a valve plug generally designated 80. In particular, the valve plug 80 is rotatably received concentrically within the cylindrical valve body or housing 34, and includes on its underside a coaxial boss 81 depending conformably into the recess 38 of plug 35.

The valve body or cylindrical housing 34 includes a pair of angularly spaced through nipples or fluid connections, as at 82 and 83, best seen in FIG. 4. The fluid connections 82 and 83 of the valve body 34 are angularly spaced apart approximately 90°, and are generally coplanar, in the same horizontal plane.

The valve plug 80 is generally of a cylindrical configuration, having a diameter slightly less than the internal diameter of the receiving valve housing 34, for purposes appearing presently. Formed in the valve plug 80 is a generally coaxial through opening, passageway or bore 84 which extends generally vertically as shown in FIG. 1. A transverse, horizontal or diametral through opening or bore 85 is also formed in the valve plug 80, intersecting with the vertical bore 84. In addition, the exterior of the valve plug 80 is formed with a pair of passageways 86 and 87 extending generally vertically from approximately the horizontal plane of the diametral bore 85 upwardly through the upper end of the valve plug. The vertical passageways 86 and 87 are generally coplanar, being located in diametral opposition with each other and in a plane approximately normal to the horizontal bore 85. A generally sinusoidal groove 88 is formed in the cylindrical external surface of the valve plug 80, completing two cycles upon its circumferential path about the valve plug. Further, the groove 88 is arranged with a pair of diametrically opposed lower lobes or arcs extending beneath the diametrically opposed passageways 86 and 87, and the remaining upper lobes or arcs extending over respective ends or end openings of the horizontal through passageway 85. Thus, the groove passes between each adjacent pair of passageways 86 and 87, and the ends or end openings of bore 85. A continuous gasket or O-ring 89 is seated in and extends entirely along the path of sinusoidal groove 88, thus assuming the configuration thereof, and projecting slightly beyond the groove for yieldable engagement with the internal surface of the valve housing 34. By this configuration of gasket 89, it will be appreciated that each passageway 86 and 87 is closed to the bore 85 along the exterior of the valve plug.

Centrally or coaxially of the cylinder 15, there extends a tubular member or conduit 90 having its lower end closely engaged in the vertical bore 84 of valve plug 80 and upstanding therefrom for entry into the upper side of upper end closure 45. The lower end of conduit 90 is provided with a pair of cut-outs or holes 91 for opening into the transverse through bore 85, so that the bore 85 communicates from its opposite ends into the interior of conduit 90. Between the openings 91 and the lower end 92 of the conduit 90 there are provided a pair of diametrically opposed, generally circular holes 93, located in the reduced lower end extension or boss 81 of the plug 80. The upper cylinder end closure 45 is provided with a transverse passageway or bore 94 opening into the upper end of the conduit 90.

The upper end of the conduit 90 may be slidably received in the upper end closure 45, and suitable internal formation provided to assure constant communication between the passageway 94 of the upper end closure and the upper interior of the conduit 90.

A piston 95 may be slidably circumposed about the conduit or tube 90, being suitably sealed in relation thereto by gasket means; and, externally about the piston 95 may be provided additional gasket or sealing means 96 for sealing engagement with the interior of the cylinder 15. The piston 95 is slidable between upper and lower limits in abutting engagement with the upper and lower cylinder end closures 45 and 32, while defining therewith and with the cylinder 15 expansile and contractile upper and lower chambers. A magnetic circumferential member or actuator ring 97 may be carried by the piston 95, for a purpose appearing presently.

Depending from the upper clamping member or plate 53, rigid therewith is an elongate pin member or rod 100 which carries on its lower end a magnetically responsive sensor or proximity switch 101 for sensing an upper extreme position of the piston 95 in abutting engagement with the upper end closure 45, as by location of the magnetic ring 97 at the elevation of line 102. The sensor 101 is at a fixed elevation relative to the end closure 45, being fixed by clamp 53 to the threaded adjustment member 47 which, in turn, is fixed to the upper end closure. Thus, vertical positioning of the sensor 101 corresponding to vertical positioning of the upper end member 45 is automatic.

A lower proximity switch or sensor 103 is fixedly carried by a vertical post 104 upstanding from the lower end member 16, located to sense the position of piston 95 at its lower stroke end with the magnetic ring 97 at the elevation of line 104.

A shaft 110 is best seen in FIG. 6, including a circumferential band of maximum diameter or land 111, and a reduced upper end portion 112 extending from the band 111. An annular shoulder 113 extends about the shaft 110, facing upwardly between the band 111 and reduced upper end portion 112. A diametral through hole 114 is formed in the reduced upper end portion 112.

Depending from the band 111 is a further reduced cylindrical portion or shank 115 formed with a diametral slot 116. A further reduced lower terminus or end portion 117 extends coaxially from the shank 115.

In assembly the reduced upper end portion 112 is inserted upwardly coaxially into and spaced within the lower region of bore 84 in plug 80, see FIG. 5. The lower region of tube 90 depends downwardly in bore 84 to occupy the annular space between the internal diameter of the bore 84 and the upper end portion 112 of the shaft 110. The diametrically opposed holes 93 of the tube or conduit 90 are in alignment with the diametral bore 114 of shaft portion 112; and a diametral bore 118 is formed in the lower end portion 81 of plug 80, so that a retaining pin 119 extends into the aligned bores 114 and 118, and holes 93. As noted, the reduced lower end portion 81 of plug 80 is conformably and rotatably received in the upper end recess 38 of lower end closure plug 36, so that the pin 119 is held captive by the element 36, best seen in FIG. 5.

The band or land 111 of shaft 110 is rotatably received in the lower end member 35, and suitable seals may be provided therebetween, such as O-rings shown at 120 in FIG. 1.

The shank 115 of shaft 110 depends through and beyond the underside of lower end member 16, wherein it may be suitably journaled, as by bearing 125.

A generally cylindrical wall 126 may depend from the underside of lower end member 16 and wall 13, conformably receiving in its upper region the depending boss 25 and coaxially surrounding and spacedly receiving the shank 115. The lower end of cylindrical wall 126 may be closed by a lower end wall 127, which surrounds and may carry a bearing 128 journaling the lower terminal portion 117 of shank 115.

Figure 7:
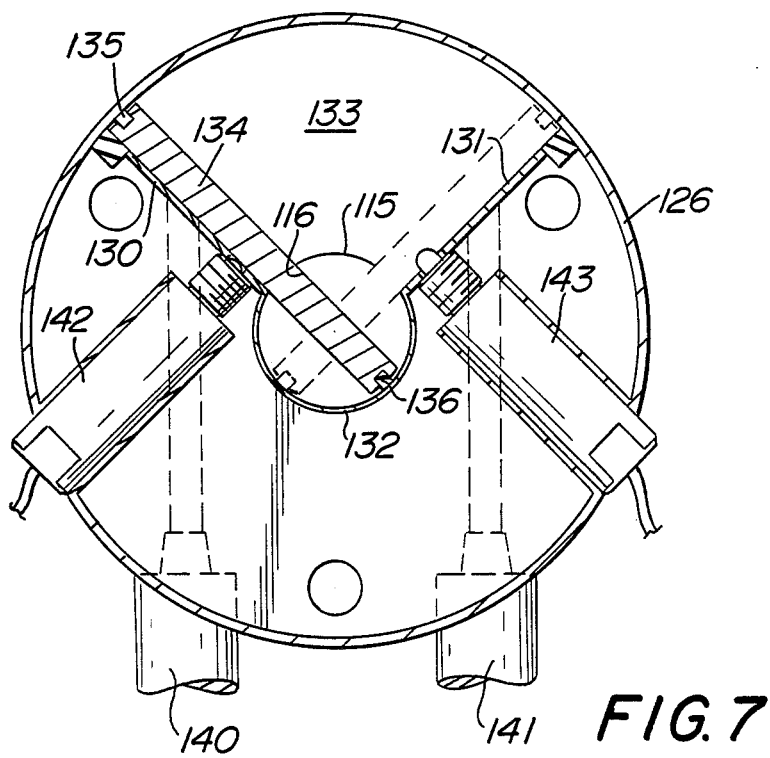
FIG. 7 is a transverse sectional view taken generally along the line 7—7 of FIG. 1.

Extending radially in the annular space defined between the shank 115 and cylinder 126, and plug 25 and lower end closure 127, are a pair of radial walls 130 and 131, disposed generally normal to each other. In addition, an arcuate wall 132 may extend conformably about the shank 115 between the inner ends of the radial walls 130 and 131. A substantially sector shaped chamber 133, less the part occupied by shank 115, is thereby defined between the walls 130 and 131. A vane or blade 134 extends through the slot 116 of shank 115 and radially outwardly to the inner surface of cylindrical wall 126 for rotation with the shaft 110 between the solid and phantom extreme positions respectively in facing engagement with walls 130 and 131, as shown in FIG. 7. The blade or vane 134 may have its opposite ends sealed, as by sealing members 135 and 136, in respective engagement with the walls 126 and 132.

A pair of fluid pressure connectors 140 and 141 may be connected between a source of fluid under pressure and communicate through respective radial walls 130 and 131. Thus, it will be apparent that the vane 134 may be driven by fluid pressure back and forth between its extreme positions, the fluid pressure being alternately on opposite sides of the vane. Of course, suitable venting is provided to permit full vane movement.

In addition, sensors 142 and 143, such as push button switches, may enter respectively through radial walls 130 and 131 to sense when the vane 134 is in its solid line and phantom positions, respectively. The sensors 142 and 143 may effect operation of valving associated with the fluid connectors 140 and 141 to close and open respective connectors when the vane 134 reaches each of its extreme positions. For example, when the vane 132 reaches its solid line position, the connector 141 would be closed and the connector 140 opened to swing the vane to its phantom position. This vane oscillation effects similar 90° oscillation of the valve plug 80 to effect metering operation as in said U.S. Patent. Of course, the vane position sensors 142 and 143 are interlocked with the piston position sensors 101 and 103, the latter being primary to operation. The vane position sensors 142 and 143 insure that full 90° rotation of the valve plug 80 is achieved.

From the foregoing it is seen that the device of the present invention is admirably well suited to be quickly and easily disassembled for cleaning and reassembled, with a minimum of tools, that precision manufacture of parts is minimized to effect savings in manufacturing costs, and that the device otherwise fully accomplishes its intended objects.

Although the present invention has been described in some detail by way of illustration and example for purposes of clarity of understanding, it is understood that certain changes and modifications may be made within the spirit of the invention.

What is claimed is:

1. A metering device comprising a mounting structure, a cylinder mounted by said mounting structure, and closures closing opposite ends of said cylinder, a piston in said cylinder shiftable between said end closures, a conduit in said cylinder extending in fluid communication between said enclosures, angularly spaced inlet and outlet connections opening into one end closure, a valve plug angularly shiftable in said cylinder adjacent to said one end closure, said valve plug having angularly spaced passageways communicating said connections with respective sides of said piston and upon plug shifting communicating said connections with other sides of said piston, and gasket means extending in sealing relation about said plug and on opposite sides of said passageways to seal the latter from each other, said passageways being generally coplanar, and said gasket means extending generally sinusoidally an even number of cycles about the circumference of said valve plug onto opposite sides of said passageways, to effect said sealing while balancing forces between said plug and cylinder and self centering of said plug in said cylinder.

2. A metering device according to claim 1, said conduit removably centrally entering said plug on one side thereof adjacent to said piston, a shaft centrally removably entering said plug and conduit from the side of said plug opposite to said conduit, a pin extending removably transversely through said plug and conduit and shaft for unitary angular shifting of said plug and conduit and shaft to communicate said conduit with a selected side of said piston, and shifting means for effecting said angular shifting.

3. A metering device comprising a mounting structure, a cylinder mounted by said mounting structure, end closures closing opposite ends of said cylinder, a piston in said cylinder shiftable between said end closures, a conduit in said cylinder extending in fluid communication between said end closures, angularly spaced inlet and outlet connections opening into one end closure, a valve plug angularly shiftable in said cylinder adjacent to said one end closure, said valve plug having angularly spaced passageways communicating said connections with respective sides of said piston and upon plug shifting communicating said connection with the other sides of said piston, gasket means extending in sealing relation about said plug and on opposite sides of said passageways to seal the latter from each other, a shaft projecting centrally from said plug away from said piston and fixed to said plug and conduit for simultaneous angular shifting of said plug and conduit and shaft, a vane extending radially from said shaft for angular shifting, therewith, an enclosure receiving said vane during angular shifting thereof and combining therewith to define expansile and contractile fluid chambers on opposite sides of said vane, and fluid pressure means selectively connectable to said chambers for swinging said vane to shift said plug.

4. A metering device according to claim 3, in combination with sensing means in said chambers to sense completed vane shifting and assure proper fluid pressure transmission until vane shifting is complete.

5. A metering device according to claim 4, said conduit extending coaxially into said plug adjacent to said piston, said shaft extending coaxially into said plug remote from said piston, and a pin removable extending transversely through said plug and conduit and shaft, for ease of disassembly and reassembly.

6. A metering device according to claim 3, said passageways being generally coplanar, said gasket means extending generally sinusoidally on opposite sides of said passageways to effect said sealing, and said generally sinusoidal gasket means extending an even number of cycles about the circumference of said valve plug, for balanced forces between said plug and cylinder and self centering of said plug in said cylinder.

7. A metering device comprising a mounting structure, a cylinder mounted by said mounting structure, end closures closing opposite ends of said cylinder, a piston in said cylinder shiftable between said end closures, a conduit in said cylinder extending in fluid communication between said end closures, angularly spaced inlet and outlet connections opening into one end closure, a valve plug angularly shiftable in said cylinder adjacent to said one end closure, said valve plug having angularly spaced passageways communicating said connections with respective sides of said piston and upon plug shifting communicating said connections with the other sides of said piston, gasket means extending in sealing relation about said plug and on opposite sides of said passageways to seal the latter from each other, said conduit extending coaxially into said plug adjacent to said piston, a shaft projecting into said plug and conduit from the opposite side of plug as said conduit, and a pin removably extending transversely through said plug and conduit and shaft, for ease of disassembly and reassembly.

8. A metering device according to claim 7, said plug being rotatably received in said one end closure, and said pin being removably retained in said plug and conduit and shaft by end engagement with said one end closure.

* * * * *